US012593905B2

(12) United States Patent
Desmarais et al.

(10) Patent No.: US 12,593,905 B2
(45) Date of Patent: *Apr. 7, 2026

(54) DEVICES AND METHODS FOR MOUNTING AN ARTICLE TO A SURFACE

(71) Applicant: ATHENA CLUB HOLDINGS, INC., New York, NY (US)

(72) Inventors: Charles Desmarais, New York, NY (US); Maria Markina, New York, NY (US); Christopher Nicholas Hibmacronan, Oakland, CA (US); Joshua Morenstein, San Francisco, CA (US); Jean Soo Hyun, San Francisco, CA (US)

(73) Assignee: Athena Club Holdings, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,201

(22) Filed: Apr. 5, 2024

(65) Prior Publication Data

US 2024/0381991 A1 Nov. 21, 2024

Related U.S. Application Data

(63) Continuation of application No. 18/093,647, filed on Jan. 5, 2023, now Pat. No. 11,974,646, which is a (Continued)

(51) Int. Cl.
*A45D 27/29* (2006.01)
*A45D 27/22* (2006.01)
(Continued)

(52) U.S. Cl.
CPC .............. *A45D 27/29* (2013.01); *B26B 21/40* (2013.01); *F16M 13/02* (2013.01); *A45D 27/22* (2013.01); *A45D 2200/25* (2013.01)

(58) Field of Classification Search
CPC ........ A45D 27/29; B26B 21/40; B26B 21/00; B26B 21/22; B26B 19/3833; F16M 13/02; A47D 27/22; B62B 21/40; A47G 29/08
See application file for complete search history.

(56) References Cited

U.S. PATENT DOCUMENTS 1,432,822 A 10/1922 Wood
2,385,859 A 10/1945 Jacobson
(Continued)

FOREIGN PATENT DOCUMENTS

GB 2218368 11/1989

OTHER PUBLICATIONS

Office Action for U.S. Appl. No. 17/536,510, mailed Apr. 22, 2022.
(Continued)

*Primary Examiner* — Jonathan Liu
(74) *Attorney, Agent, or Firm* — Mills IP Law, PLLC

(57) ABSTRACT

In some embodiments, an apparatus includes a holder including a first surface, a second surface, a body portion in between the first surface and the second surface, and a protrusion. The first surface is configured to be coupled to a mounting surface. A magnet is disposed within the body such that a portion of the second surface is magnetically attractable to a first portion of an article. The protrusion is configured to engage a second portion of the article. The article being removably coupled to the holder when the first portion of the article is magnetically coupled against the portion of the second surface and the second portion of the article is engaged with the protrusion.

19 Claims, 15 Drawing Sheets

Related U.S. Application Data continuation of application No. 17/536,510, filed on Nov. 29, 2021, now Pat. No. 11,576,477.

(60) Provisional application No. 63/121,440, filed on Dec. 4, 2020.

(51) Int. Cl.
  *B26B 21/40* (2006.01)
  *F16M 13/02* (2006.01)

(56) References Cited

U.S. PATENT DOCUMENTS

| | | | |
|---|---|---|---|
| 2,414,653 A | 1/1947 | Lookholder | |
| 2,457,421 A | 12/1948 | Warren | |
| 2,474,036 A | 6/1949 | Curley | |
| 2,635,843 A | 4/1953 | Small | |
| 2,639,880 A | 5/1953 | Belloff et al. | |
| 2,642,999 A | 6/1953 | McPherson | |
| 2,705,834 A | 4/1955 | Lundy | |
| 2,949,509 A * | 8/1960 | Whidden | H04M 1/0202 |
| | | | 379/426 |
| 2,960,237 A | 11/1960 | McEnery | |
| 2,966,992 A | 1/1961 | Dunkelberger et al. | |
| 3,007,568 A | 11/1961 | Kurland | |
| 3,031,757 A | 5/1962 | Kramer | |
| 3,159,372 A | 12/1964 | McIntosh | |
| 3,171,176 A | 3/1965 | Shirley | |
| 3,229,820 A | 1/1966 | Hentzi et al. | |
| 3,239,178 A | 3/1966 | Pompa | |
| 3,337,100 A | 8/1967 | Berning | |
| 3,346,952 A | 10/1967 | Harris | |
| 3,472,391 A | 10/1969 | Bolognesi | |
| 3,754,326 A | 8/1973 | Glaberson | |
| 3,863,873 A | 2/1975 | Cushing | |
| 3,945,499 A * | 3/1976 | Brownson | A45D 27/29 |
| | | | 211/88.01 |
| D253,150 S | 10/1979 | Heckler | |
| 4,198,745 A | 4/1980 | Moehlenpah | |
| 4,275,862 A | 6/1981 | Takagi et al. | |
| 4,450,980 A | 5/1984 | Clabby et al. | |
| 4,644,645 A | 2/1987 | Audet | |
| 4,830,321 A | 5/1989 | Irie | |
| 5,064,159 A | 11/1991 | Kotick | |
| 5,083,733 A | 1/1992 | Marino et al. | |
| 5,163,566 A | 11/1992 | Hempel | |
| D333,583 S | 3/1993 | Hurd | |
| 5,228,580 A | 7/1993 | Grange | |
| 5,417,397 A | 5/1995 | Harnett | |
| 5,457,887 A | 10/1995 | Grange | |
| D369,709 S * | 5/1996 | Triplett | D6/526 |
| 5,517,712 A | 5/1996 | Schiano | |
| D370,375 S | 6/1996 | Murgida et al. | |
| 5,615,858 A | 4/1997 | Sferruzza, Jr. | |
| 5,760,668 A | 6/1998 | Testa et al. | |
| 5,903,978 A * | 5/1999 | Prochaska | B26B 21/522 |
| | | | 30/34.05 |
| 6,076,790 A | 6/2000 | Richter | |
| 6,135,408 A | 10/2000 | Richter | |
| 6,367,126 B1 | 4/2002 | Rivkin | |

| | | | |
|---|---|---|---|
| 6,415,517 B1 | 7/2002 | Worrick, III | |
| 6,888,940 B1 | 5/2005 | Deppen | |
| 7,040,024 B2 | 5/2006 | Lukan et al. | |
| 7,163,181 B2 | 1/2007 | Omps | |
| 7,310,035 B2 | 12/2007 | Wooten | |
| 7,506,854 B2 | 3/2009 | Lukan | |
| 7,654,003 B2 | 2/2010 | Simms et al. | |
| D625,130 S | 10/2010 | Szczepanowski et al. | |
| D632,516 S | 2/2011 | Schulz et al. | |
| D640,079 S | 6/2011 | Kinard et al. | |
| D647,496 S | 10/2011 | Tung | |
| D656,351 S | 3/2012 | Christie | |
| 8,185,998 B2 | 5/2012 | Xu | |
| 8,205,846 B2 | 6/2012 | Glunk | |
| 8,573,548 B2 | 11/2013 | Kuhn et al. | |
| 8,936,222 B1 | 1/2015 | Bastian et al. | |
| 9,560,923 B1 | 2/2017 | Winnard | |
| 10,104,950 B1 | 10/2018 | Provost et al. | |
| 10,357,093 B2 | 7/2019 | Atlason et al. | |
| D873,580 S | 1/2020 | McGarry et al. | |
| D874,180 S | 2/2020 | McGarry et al. | |
| 10,631,612 B2 | 4/2020 | Atlason et al. | |
| 10,899,029 B1 | 1/2021 | Atlason et al. | |
| D964,065 S | 9/2022 | Ramm et al. | |
| D976,610 S | 1/2023 | Riehle et al. | |
| 11,576,477 B2 | 2/2023 | Desmarais et al. | |
| 11,974,646 B2 * | 5/2024 | Desmarais | B26B 21/40 |
| 2002/0153863 A1 | 10/2002 | Arndt | |
| 2003/0070998 A1 | 4/2003 | Bulka | |
| 2004/0188576 A1 | 9/2004 | Carnevali | |
| 2004/0200080 A1 | 10/2004 | Lauri | |
| 2006/0032055 A1 | 2/2006 | Simms et al. | |
| 2007/0220754 A1 | 9/2007 | Barbaro et al. | |
| 2008/0296244 A1 | 12/2008 | Tomassetti | |
| 2009/0056141 A1 | 3/2009 | Barry et al. | |
| 2009/0184015 A1 | 7/2009 | Ruppert | |
| 2010/0257744 A1 | 10/2010 | Malkewich | |
| 2010/0325904 A1 | 12/2010 | West | |
| 2015/0314464 A1 | 11/2015 | Guzak | |
| 2015/0320178 A1 | 11/2015 | Fish | |
| 2017/0043492 A1 | 2/2017 | Robertson et al. | |
| 2017/0280849 A1 | 10/2017 | Provost et al. | |
| 2018/0079095 A1 | 3/2018 | Robertson et al. | |
| 2018/0160790 A1 | 6/2018 | Swatty et al. | |
| 2019/0098982 A1* | 4/2019 | Atlason | B26B 19/3833 |
| 2020/0128938 A1 | 4/2020 | Atlason et al. | |
| 2020/0178669 A1 | 6/2020 | Johnson | |
| 2020/0338768 A1 | 10/2020 | Dixon | |
| 2021/0282526 A1 | 9/2021 | Szczepanowski | |
| 2022/0175108 A1 | 6/2022 | Desmarais et al. | |
| 2023/0148729 A1 | 5/2023 | Desmarais et al. | |

OTHER PUBLICATIONS

Final Office Action for U.S. Appl. No. 17/536,510, mailed Aug. 4, 2022.

International Search Report and Written Opinion for PCT/US21/60954, mailed Feb. 14, 2022.

Office Action for U.S. Appl. No. 18/093,647, mailed Aug. 15, 2023.

Extended Search Report for European Application No. 21901280.4, mailed Sep. 23, 2024.

* cited by examiner

132

140, 141

126

120

130

136

128

DEVICES AND METHODS FOR MOUNTING AN ARTICLE TO A SURFACE

CROSS-REFERENCE TO RELATED APPLICATIONS

This application is a continuation of U.S. application Ser. No. 18/093,647, filed Jan. 5, 2023, entitled "Devices and Methods for Mounting an Article to a Surface," which is a continuation of U.S. application Ser. No. 17/536,510, filed Nov. 29, 2021, entitled "Devices and Methods for Mounting an Article to a Surface" (now U.S. Pat. No. 11,576,477), which claims priority to and the benefit of U.S. Provisional Patent Application No. 63/121,440, filed Dec. 4, 2020, and entitled "Devices and Methods for Mounting an Article to a Surface," each of the disclosures of which is incorporated herein by reference in its entirety.

BACKGROUND

The embodiments described herein relate to devices and methods for mounting an article to a surface. More specifically, embodiments described herein relate to a holder that can be used to removably mount an article to a surface, such as a wall.

There are many known mounting devices such as, for example, brackets, shelves, hooks, supports, etc., that can be used to removably hold or secure an item or article to a surface, such as a wall (e.g., any wall such as a shower wall, a bathroom wall, a garage wall, a kitchen wall, etc.), a refrigerator, a tool box, or any of a variety of other surfaces. Various types of fastening techniques can be used to secure such mounting devices to the surface such as threaded fasteners, nails, suction cups, adhesive, and the like. In addition, various mechanisms are provided in such devices for holding an item or article to the device, such as, for example, hooks and magnets.

Although there are many known mounting devices, such devices may have a design that limits the particular type of item or article that can be held or secured with the device. Some known devices may also have shortfalls as to how easy the device is to mount to the surface and/or how easy it is to attach and remove an item or article to the device. For example, some devices may require threaded fasteners and tools to secure the device to a mounting surface such as a wall. Some devices may have features to secure an item or article that make it difficult to remove the item once it has been attached to the device. Some devices may have limited access to grasp the item or article after it has been secured to the device.

Thus, a need exists for improvements in organizing items and articles and providing a holder for removably mounting items or articles to a surface, such as a wall, while providing easy access to the item or article for removal when needed.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

In some embodiments, a holder for removably holding an article includes a body, a rear portion coupled to the body and having a first surface, a front portion coupled to the body and having a second surface, and a magnet disposed within the body. The first surface is configured to be coupled to a mounting surface. The second surface is opposite the first surface. The magnet is positioned within the body such that a portion of the second surface is magnetically attractable to a first portion of the article. At least one of the body or the front portion form a protrusion configured to engage a second portion of the article. The article is removably coupled to the holder when the first portion of the article is magnetically coupled against the portion of the second surface and the second portion of the article is engaged with the protrusion.

In some embodiments, the article is a razor having a razor head and a handle. The handle includes the first portion couplable to the second surface of the holder. The razor head is the second portion and is configured to be engaged with the protrusion. In some embodiments, the first portion of the handle couplable to the second surface of the holder is flat and the portion of the second surface is flat. In some embodiments, the portion of the second surface is a planar flat surface. In some embodiments, the second surface of the holder has a surface area greater than a surface area of the first portion of the handle couplable to the second surface of the holder. This arrangement allows a portion of the second surface to be uncovered when the razor is coupled to the holder.

In some embodiments, an apparatus includes a holder including a first surface, a second surface, a body portion in between the first surface and the second surface, and a protrusion. The first surface is configured to be coupled to a mounting surface. A magnet is disposed within the body portion such that a portion of the second surface is magnetically attractable to a first portion of an article. The protrusion is configured to engage a second portion of the article. The article is removably coupled to the holder when the first portion of the article is magnetically coupled against the portion of the second surface and the second portion of the article is engaged with the protrusion.

In some embodiments, an apparatus includes a holder including a first surface, a second surface, a body portion in between the first surface and the second surface, and a protrusion. The first surface is configured to be coupled to a mounting surface. The protrusion is configured to engage a portion of an article to removably couple the article to the holder. The second surface is a planar flat surface and is angled relative to the first surface such that when the article is coupled to the holder a portion of the article that extends below the holder is spaced a distance from the mounting surface.

DETAILED DESCRIPTION

Figures 1A, 1B:
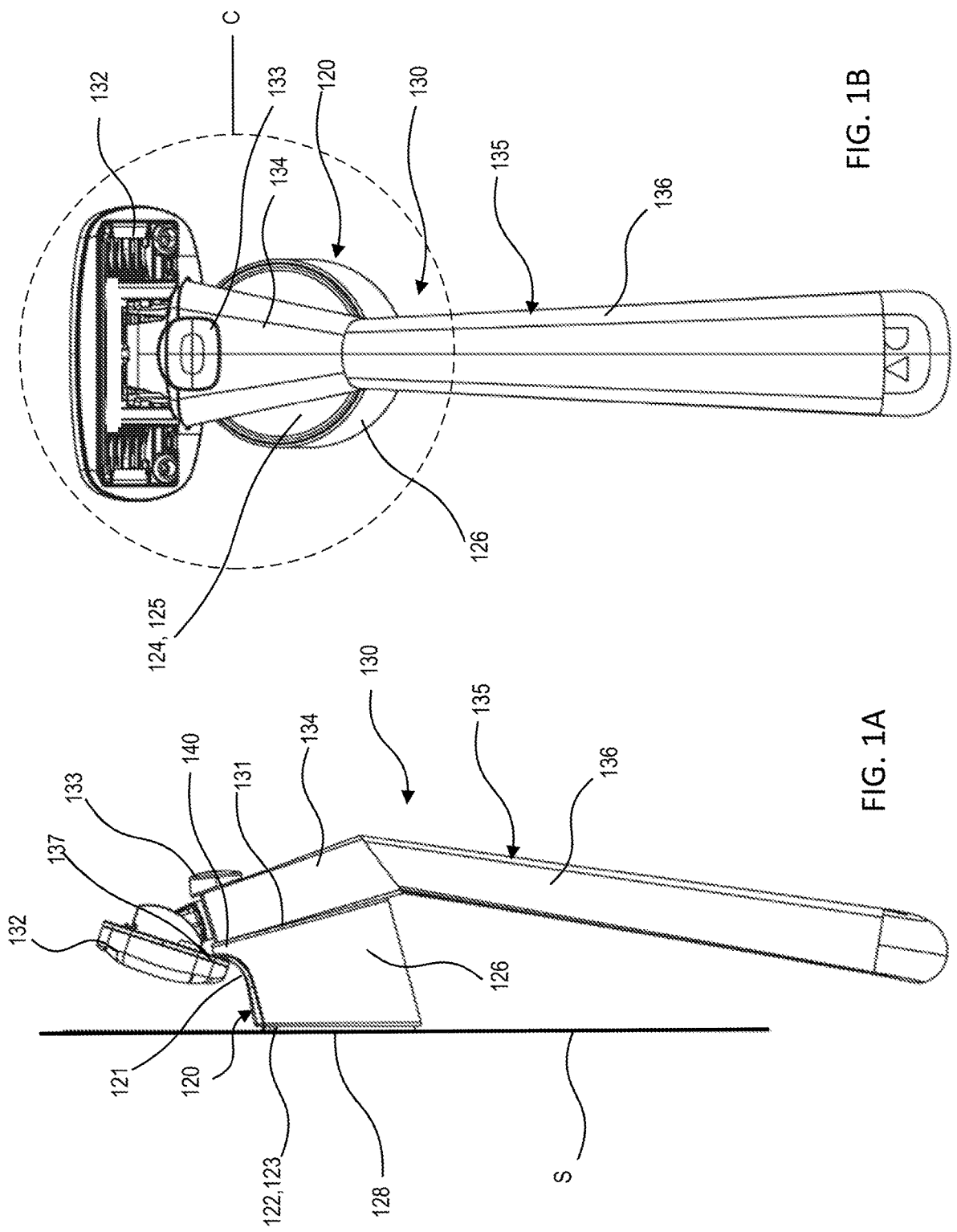
FIG. 1A is a side view of a razor coupled to a holder, according to an embodiment.
FIG. 1B is a front view of the razor and holder of FIG. 1A.

The apparatus described herein can be used to removably hold an article or item to a mounting surface. More specifically, embodiments of a holder are described herein that can be used to removably hold a variety of different types of articles or items to a mounting surface. For example, the holders described herein can be mounted to a wall (e.g., a bathroom, wall, shower wall, kitchen wall, garage wall, etc.), to a refrigerator, a tool box, within an office system, etc. The holders can be used to hold a razor or other bathroom articles such as a loofa, brush, nail clippers, etc. to the mounting surface. The holders can also be used to removably hold other types or articles or items, such as kitchen items, or various tools (e.g., screw drivers, etc.), office supplies, etc.

The holders described herein provide for easy access to removably couple an article to the holder and to easily remove the article from the holder for use. For example, an article can be coupled to a holder with unobstructed access to grasp the article or a portion of the article (e.g., a handle) for removal. The holders described herein can include one or more coupling portions to removably couple an article to the holder. For example, the holders described herein can include a protrusion that functions similar to a hook to allow for a portion of an article to be easily coupled and decoupled from the holder. The holders can optionally include a magnet that can be used to provide a second coupling portion to couple an article to the holder. In this manner, the holder can produce two distinct coupling points to which the article can be coupled, which can improve the attachment strength, limit undesired movement of the article (e.g., rotation of the article relative to the holder), and still allow for easy access for removal of the article.

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

Figure 1C:
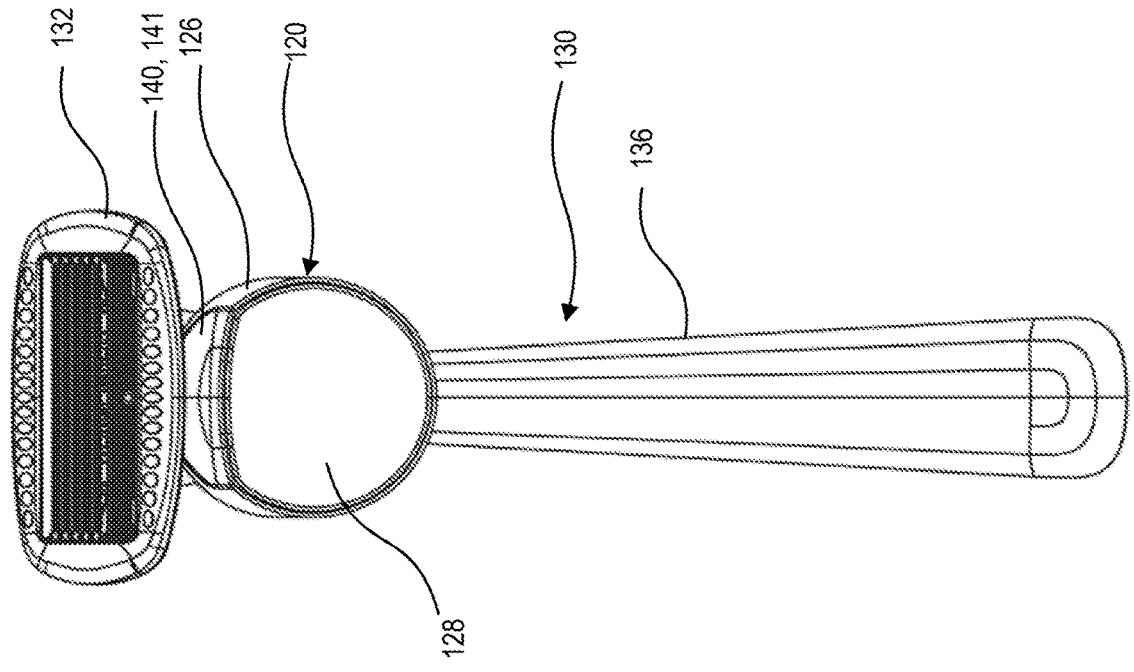
FIG. 1C is a back view of the razor and holder of FIG. 1A.

FIGS. 1A-1C illustrate a holder 120 according to an embodiment, shown holding a razor 130 to a mounting surface S. FIG. 1A is a side view, FIG. 1B is a front view, and FIG. 1C is a rear view (as seen from a mounting surface S) of the holder 120 and razor 130. The holder 120 can be used to removably hold a variety of different types of articles, such as the razor 130, to a mounting surface S. For example, the holder 120 can be used to hold a razor (such as razor 130) or other bathroom articles such as a loofa, brush, nail clippers, etc. The holder 120 can also be used to removably hold other types or articles or items, such as kitchen items, or various tools (e.g., screw drivers, etc.). For example, the holder 120 can be mounted to a wall (e.g., a bathroom, wall, shower wall, kitchen wall, garage wall, etc.), to a refrigerator, a tool box, within an office system, etc.

The holder 120 includes a rear plate 122 (also referred to as "rear portion") having a first surface 123 (also referred to herein as a "rear surface"), a front plate 124 (also referred to as a "front portion") having a second surface 125 (also referred to herein as a "front surface"), and a base portion 126. In some embodiment, the front plate 124, the base 126 and the rear plate 122 are each separate components coupled together with, for example, an adhesive or welding. In some embodiments, the rear plate 122 can be formed integrally or monolithically with the base 126 and coupled to the front plate 124, or the front plate 124 can be formed integrally or monolithically with the base 126 and be coupled to the rear plate 122. In yet other embodiments, the rear plate 122, the front plate 124, and the base 126 can be monolithically formed.

The holder 120 can be mounted to the mounting surface S by any suitable means. For example, in some embodiments the holder includes an adhesive member 128 disposed on the rear surface 123. The adhesive member 128 can be, for example, a two-sided adhesive tape that has a first side that is adhesively attached to the rear surface 123 and a second opposite side that includes an adhesive to affix the holder 120 to the mounting surface S. The second side of the adhesive member 128 can include an adhesive cover that is removable by a user to expose the adhesive and mount the holder 120 to a mounting surface. This arrangement allows for mounting the holder to a variety of different materials, such as plastic, shower tiles, glass, stone, metal, wood, or any other surface to which the adhesive will stick. In other embodiments, the holder 120 can include a magnetically attractable rear surface to allow the holder 120 to be mounted to a magnetic material (e.g., a ferromagnetic material, such as steel).

Figures 3, 4:
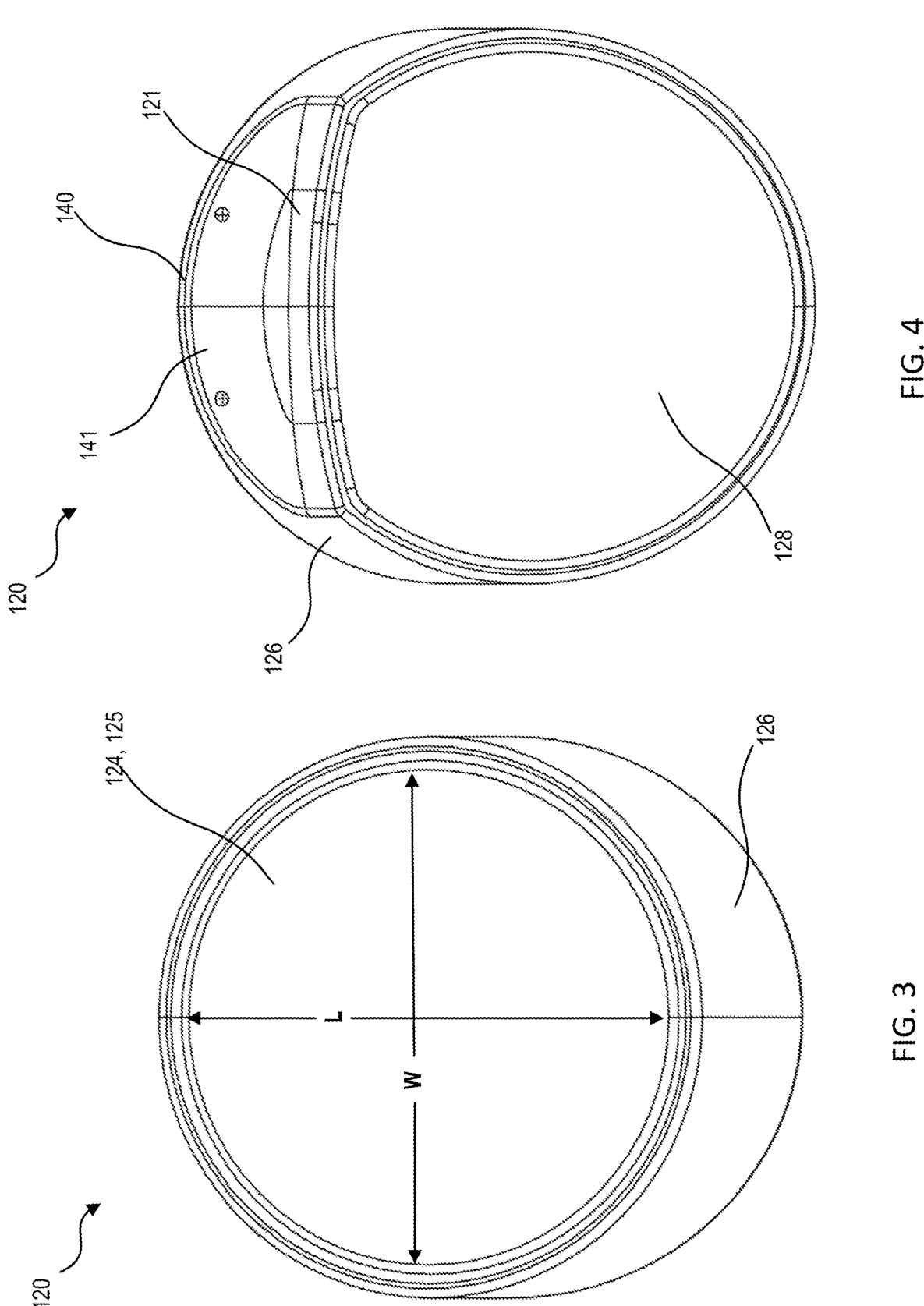
FIG. 3 is a front view of the holder of FIG. 2A.
FIG. 4 is a rear view of the holder of FIG. 2A.

The holder 120 includes a protrusion 140 that extends from a top surface 121 of the holder 120. The protrusion 140 functions similar to a hook to allow for a portion of an article to be easily coupled and decoupled from the holder 120 as described in more detail below. The protrusion 140 can be formed by the base 126 or the base portion and/or the front plate 124. The protrusion 140 is configured to engage a portion of an article to be removably coupled to the holder 120 such as the contact portion 137 of the razor 130. The protrusion 140 can maintain the article (e.g., razor 130) on the holder 120 while providing for easy removal of the article when desired by a user. As shown in the front view of the holder 120 in FIG. 3, the front surface 125 of the holder 120 has a circular shape and is disposed in front of the protrusion 140. The front surface 125 provides an area against which a second portion of the article can contact when the contact portion 137 is removably coupled to the protrusion 140. In this embodiment, the front surface is also a planar flat surface across a width W and length L (or diameter) of the front plate 124 (see, e.g., FIG. 3). The flat surface and size of the front surface 125 can accommodate a variety of different articles to be coupled to the holder 120 as described in more detail below. In addition, the holder 120 can accommodate holding more than one article as described below.

Figure 5:
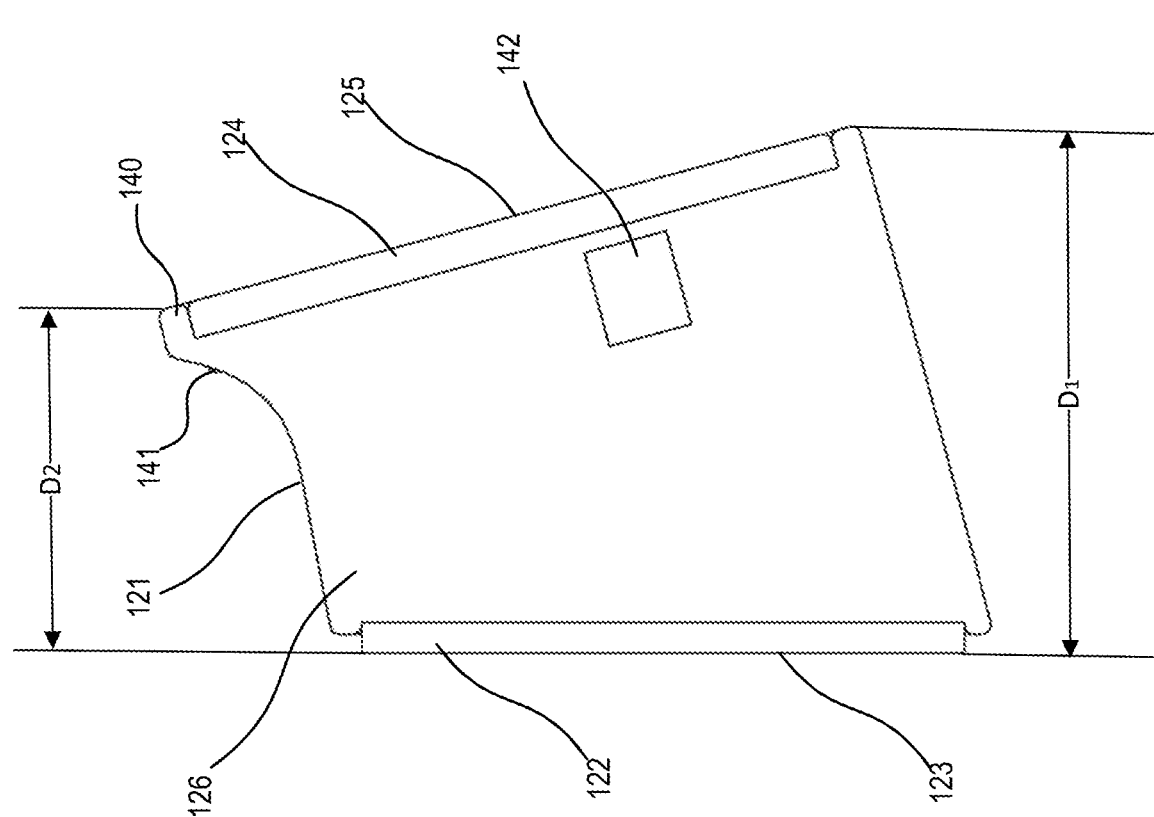
FIG. 5 is a cross-sectional view showing portions of the interior of the holder of FIG. 2A.
Figure 5:

In addition to the protrusion 140, the holder 120 can optionally include a magnet 142 (see FIG. 5) disposed within the base 126 that can be used to provide a further point of attachment for an article to the holder 120. The magnet can be of any suitable size and strength to produce the desired magnetic field from the front surface 125. For example, in some embodiments, the front surface can be a nonmagnetic material (e.g., plastic) or can be coated with a nonmagnetic material (e.g., for durability) and the magnet 142 can be located at a desired distance below the front surface 125 such that the front surface remains magnetically attractable. In other embodiments, the front plate 124 can be formed at least in part with a magnetic material rather than providing a magnet 142 within the base 126 such that the front plate 124 can provide a magnetic coupling to an article. In some cases, an article to be coupled to the holder 120 can include a portion formed of a ferromagnetic material such that the portion will be magnetically attracted to the magnet 142 of the holder 120 (or to the front plate 124). The combination of the protrusion 140 and the magnet 142 can provide for better fixation of the article to the holder 120 by providing two coupling points for an article with the holder 120. In some cases, an article to be coupled to the holder 120 can include a magnet that can be magnetically coupled to the magnet 142 of the holder 120. Such an embodiment is described below with respect to FIG. 7. In addition, in some situations, the holder 120 can accommodate holding more than one article. For example, a first article can be coupled to the protrusion 140 and a second article can be magnetically coupled to the holder 120. In some cases, more than one article can be coupled to the holder 120 via the protrusion 140. For example, an article, such as a razor, can be coupled to the holder 120 (via the protrusion 140 and the magnet 142) and a second article, such as a loofa, can hang from the protrusion 140.

Figure 2A:
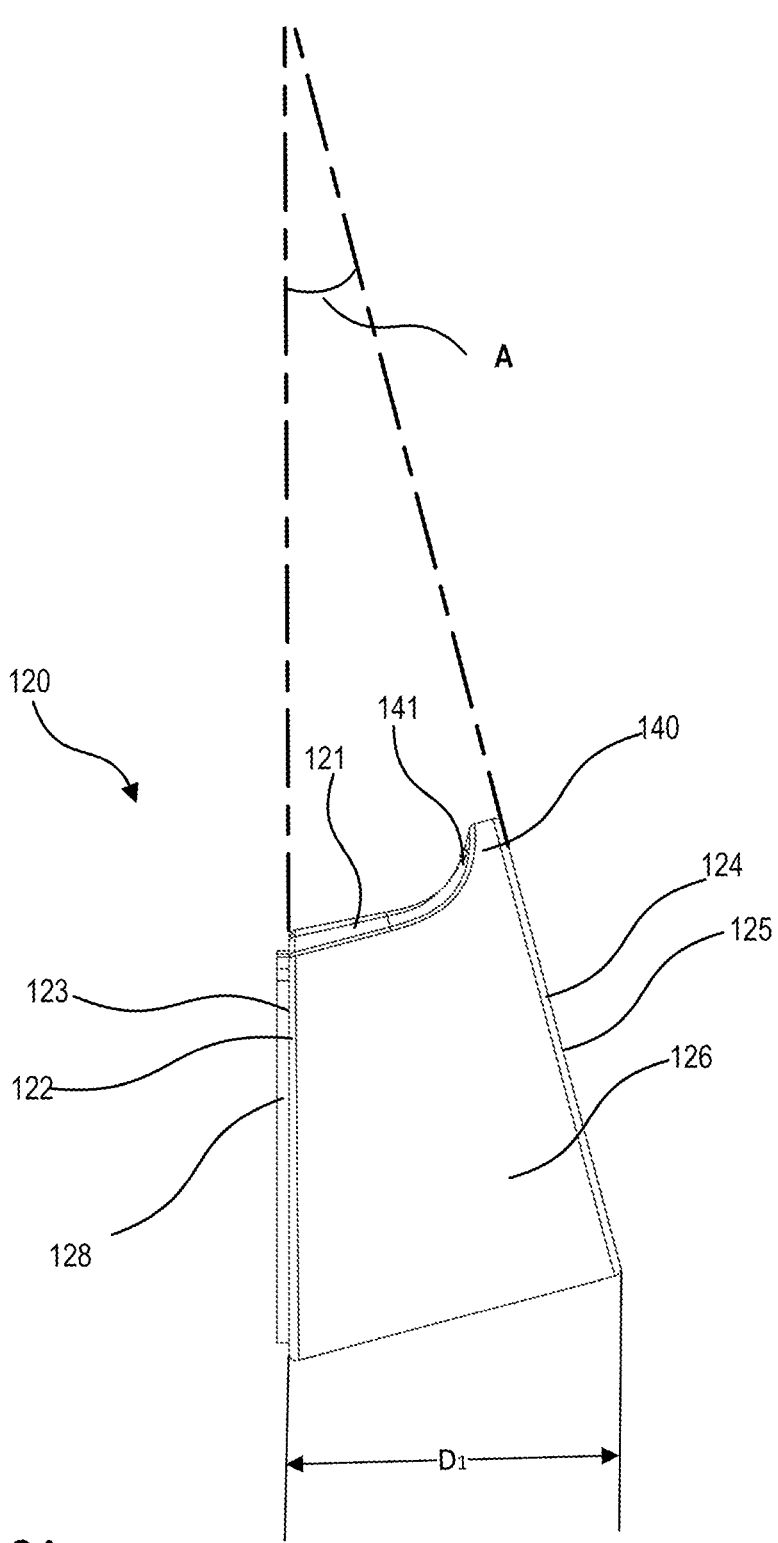
FIG. 2A is a side view of the holder of FIG. 1A showing an angle between a back surface and a front surface of the holder.
Figure 2B:
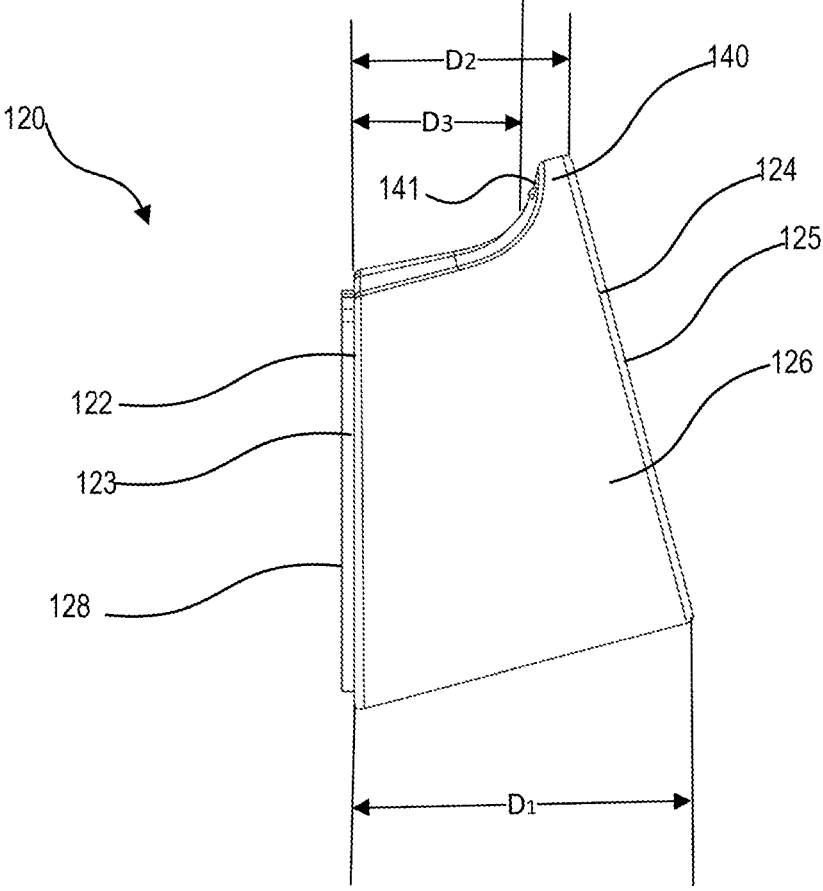
FIG. 2B is a side view of the holder of FIG. 2A showing width dimensions of the holder.

As shown in FIG. 2A, the front plate 124 (and front surface 125) of the holder 120 forms an angle A relative to the back plate 122 such that when an article is removably coupled to the holder 120, at least a portion of the article is disposed non-parallel to the mounting surface S. This arrangement helps maintain the article coupled to the holder 120 by providing an additional point of contact (or attachment via the optional magnet 142). The angled front surface 125 can also maintain the position of a lower portion of the article disposed away from the mounting surface S. Said another way, a bottom portion of the holder 120 is disposed at a greater distance from the mounting surface S than a top portion of the holder 120. For example, as shown in FIG. 2B, a bottom of the front surface 125 of the holder 120 is disposed at a distance $D_1$ from a bottom of the rear surface 123, and a top of the front surface 125 is disposed at a distance $D_2$ from a top of the rear surface 123. The distance $D_1$ is greater than the distance $D_2$ and corresponds to a width of the holder 120 at the top of the holder 120, and the distance $D_2$ corresponds to a width of the holder 120 at a bottom of the holder 120. As also shown in FIG. 2B, a contact edge 141 of the protrusion 140 is disposed at a distance $D_3$ from the rear surface 123. The contact edge 141 is where an article can engage the protrusion 140 to be held on the holder 120. The contact edge 141 can provide a surface for engagement with the article (the article can engage protrusion 140 at any other suitable surface). In some embodiments, the contact edge 141 has a portion that includes a substantially flat surface for engagement with the article. In some cases, the distance $D_3$ is selected such that when an article is disposed on the holder 120, the engaging portion of the article is spaced a distance from the mounting surface S (e.g., does not contact the mounting surface). Spacing the article slightly apart from the mounting surface can prevent scratching or damage to the mounting surface S (e.g., from a razor blade as discussed below), can allow for ample paths to drain water (e.g., shower water) away from the article (e.g., the razor head 132 discuss below), and can allow sufficient clearance to allow the user to easily remove the article from the protrusion 140. Moreover, the angled front surface 125 can also accommodate an article (e.g., razor) that has an angled (or bent design), and can keep the lower portion of the article (e.g., the bottom portion 136 of the handle 135 discussed below) spaced apart from the mounting surface S and at least a portion of the bottom portion 136 of the handle 135 is disposed outside of an envelope defined by the holder 120. For example, a portion of the bottom portion 136 of the handle 135 can be disposed below or beside the holder 120. The angle A can be, for example, between about 5 and 30 degrees to accommodate an article (e.g., razor) that has an angled (or bent design). For example in some embodiments, the article has an article coupling (or handle) angle of about 5 and 30 degrees.

As shown in FIGS. 1A-1C and 6, the razor 130 includes a handle 135 and a razor head 132. The handle 135 includes a top portion 134 (also referred to herein as "first portion) and a bottom portion 136 (also referred to herein as "second portion"). The razor 130 also includes a release button 133 that can be used to release the razor head 130 from the handle 135. In this embodiment, the top portion 134 is formed with a ferromagnetic material and is disposed at an angle (referred to as the coupling angle or handle angle) relative to the bottom portion 136 to provide for better ergonomics when using the razor 130. The top portion 134 of the handle 135 includes a contact surface 131 that can engage the front surface 125 of the holder 120. In some embodiments, the contact surface 131 is angled (via the handle angle) to correspond to the angle of the front surface of the holder 120. As shown, for example, in FIG. 1A, the razor 130 can be coupled to the holder 120 with the razor head 132 disposed over the protrusion 140 with a contact portion 137 of the razor head 132 engaged with the contact edge 141 of the protrusion 140 to prevent the razor 130 from falling downward. As described above, the contact edge 141 provides a surface such that the razor head 132 sits upwards against the contact edge 141 (does not angle downwards), which can help prevent accumulation of water, humidity and rust on the razor head 132 (see e.g., FIG. 1B). In addition, the contact surface 131 of the top portion 134 of the handle 135 is engaged with the front surface 125 of the holder 120 such that top portion 134 of the handle 135 is magnetically coupled to the holder 120 via the magnet 140. In some embodiments, the contact surface 131 is a substantially flat, planar surface to provide contact with an area of the front surface 125 (as opposed to just a point or line of contact). The razor 130 can be removed from the holder 120 by grasping the handle 135 and lifting the razor head 132 off of the protrusion 140. Thus, the razor 130 cannot be removed by pulling downward on the razor 130. Moreover, because in the embodiment, the front surface 125 does not surround the upper portion 134 of the handle, the razor 130 can be removed by pulling upward but in any lateral direction (e.g., upward at a 45 degree angle to a longitudinal axis of the handle 135). The lower portion 136 of the handle 135 is unobstructed in all directions to provide for easy access to grasp the handle 135 to remove the razor 130 from the holder 120.

Figure 6:
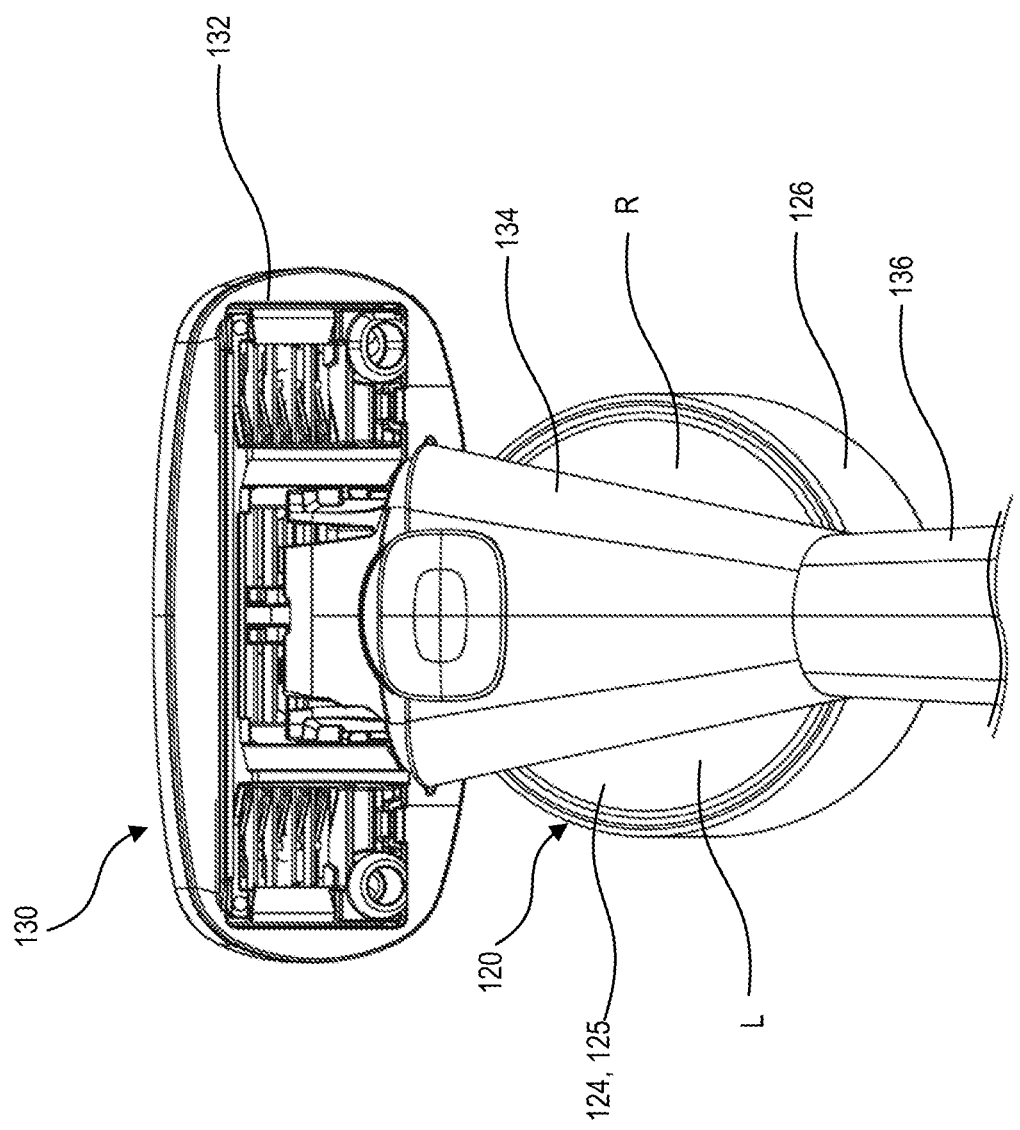
FIG. 6 is an enlarged view of the circled portion C of the razor and holder of FIG. 1B.

As shown in FIG. 6, when the razor 130 is coupled to the holder 120, a portion of the front surface 125 of the holder 120 is unobstructed. Said another way, the front surface 125 of the holder 120 has a surface area greater than a surface area of the contact surface 131 of the top portion 134 of the handle 135 such that a portion of the front surface 125 is uncovered when the razor 130 is coupled to the holder 120. More specifically, as shown in FIG. 6 a right side portion R and a left side portion L of the front surface 125 are not covered by the razor 130. This allows for the razor 130 to be easily placed on the holder 120. In other words, the size and shape of the front surface 125 of the holder 120 is not limited to the size and shape of the razor 130. Thus, the holder 120 can be used to hold razors with different sizes and shapes and/or various types of different articles. In addition, the unobstructed space on the front surface 125 can allow for a second article to be coupled to the holder 120 in some cases. For example, a user may couple a razor to the holder 120 and also a small item such as nail clippers or the like that can be magnetically coupled to the front surface 125. Moreover, although the razor handle 135 is shown as being centered on the front surface 125 (i.e., the exposed right side portion R and left side portion L are substantially equal), because the front surface 125 does not surround the upper portion 134 of the handle 135, the razor 130 can be coupled to the holder 120 asymmetrically. Similarly stated, the design of the front surface 125 allows the razor 130 to slide to the left or right (as shown in FIG. 6) while remaining mounted to the holder 120. This can allow for a larger exposed surface area of the front surface area.

Figure 7:
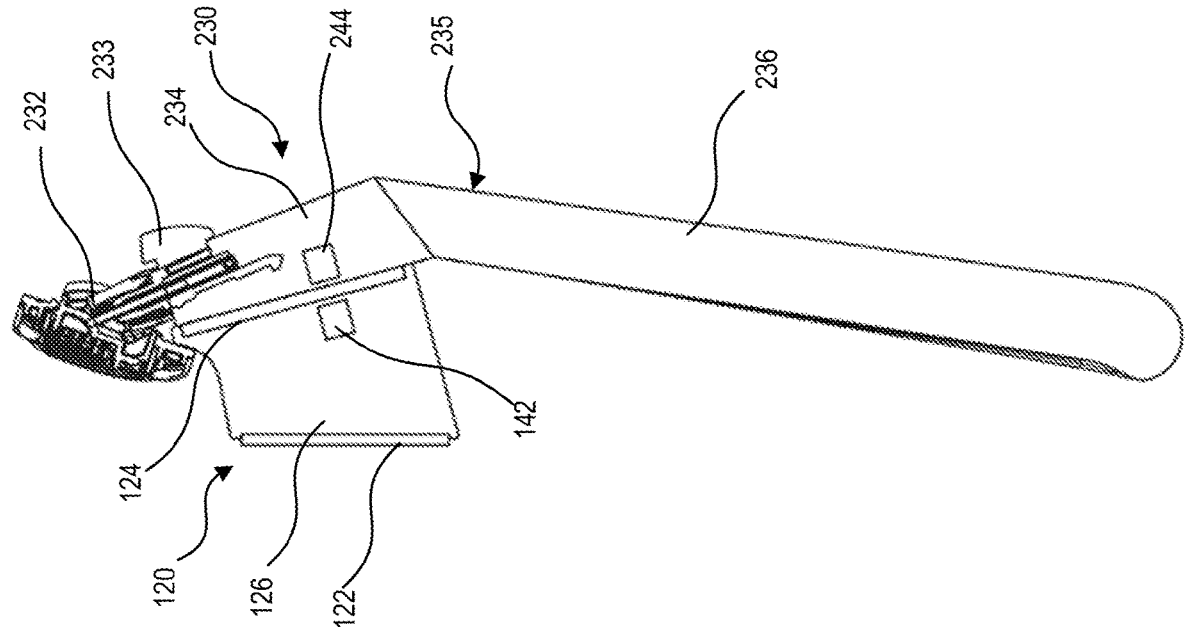
FIG. 7 is a cross-sectional view of a razor coupled to a holder, according to another embodiment.

FIG. 7 illustrates an alternative embodiment of a razor 230 couplable to the holder 120. In this embodiment, the razor 230 includes a razor head 232, a handle 235 and a release button 233. The handle 235 includes a top portion 234 (also referred to herein as "first portion") and a lower portion 236 (also referred to herein as "second portion") disposed at an angle relative to the top portion 234 as described above for razor 130. The razor head 232 can be coupled to the protrusion 140 of the holder 120 in the same manner as described above for razor 130. In this embodiment, the razor 230 includes a magnet 244 disposed within or coupled to the top portion 234 of the handle 230. The magnet 244 can have an opposite polarity as the magnet 142 within the holder 120 such that the magnet 244 can be magnetically coupled to the magnet 142 to couple the razor 230 to the holder 120.

Figure 8:
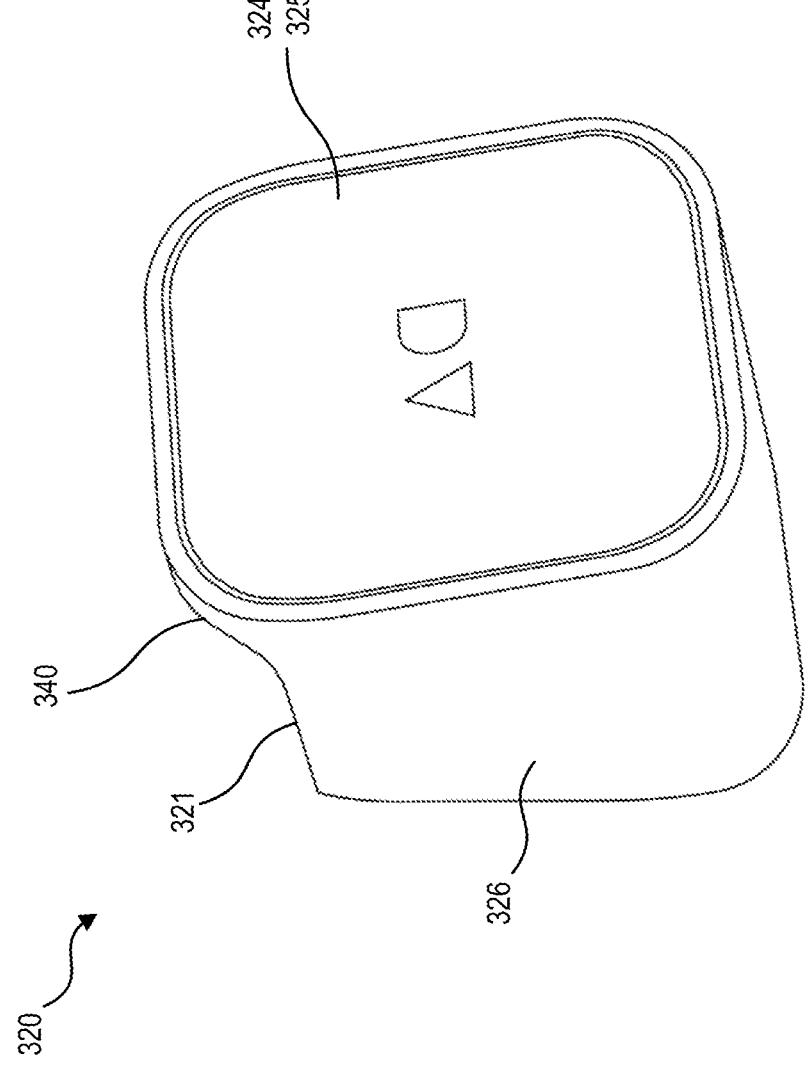
FIG. 8 is a perspective view of a holder, according to an embodiment.
Figure 9:
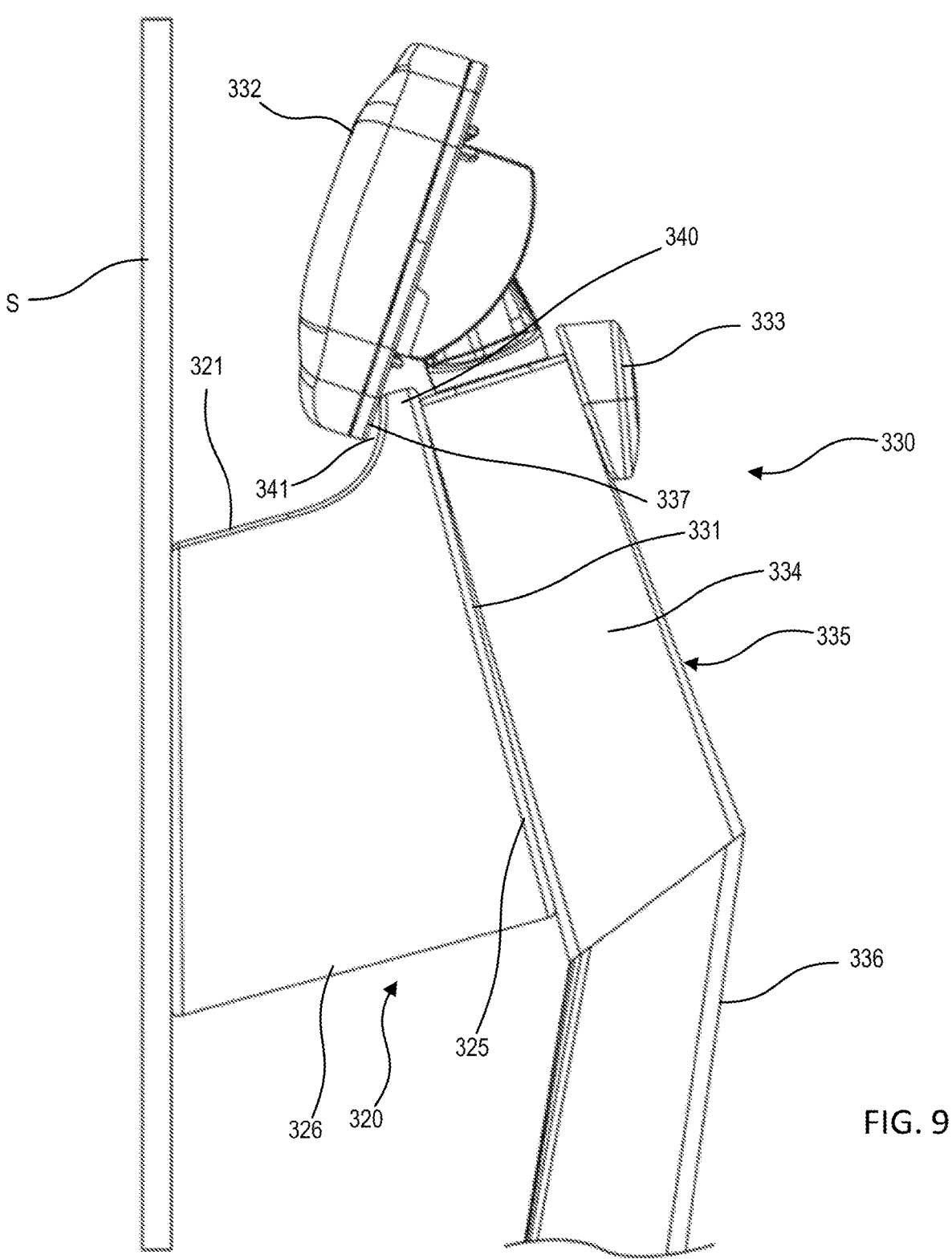
FIG. 9 is a side view of the holder of FIG. 8 with a razor coupled thereto.
Figure 10:
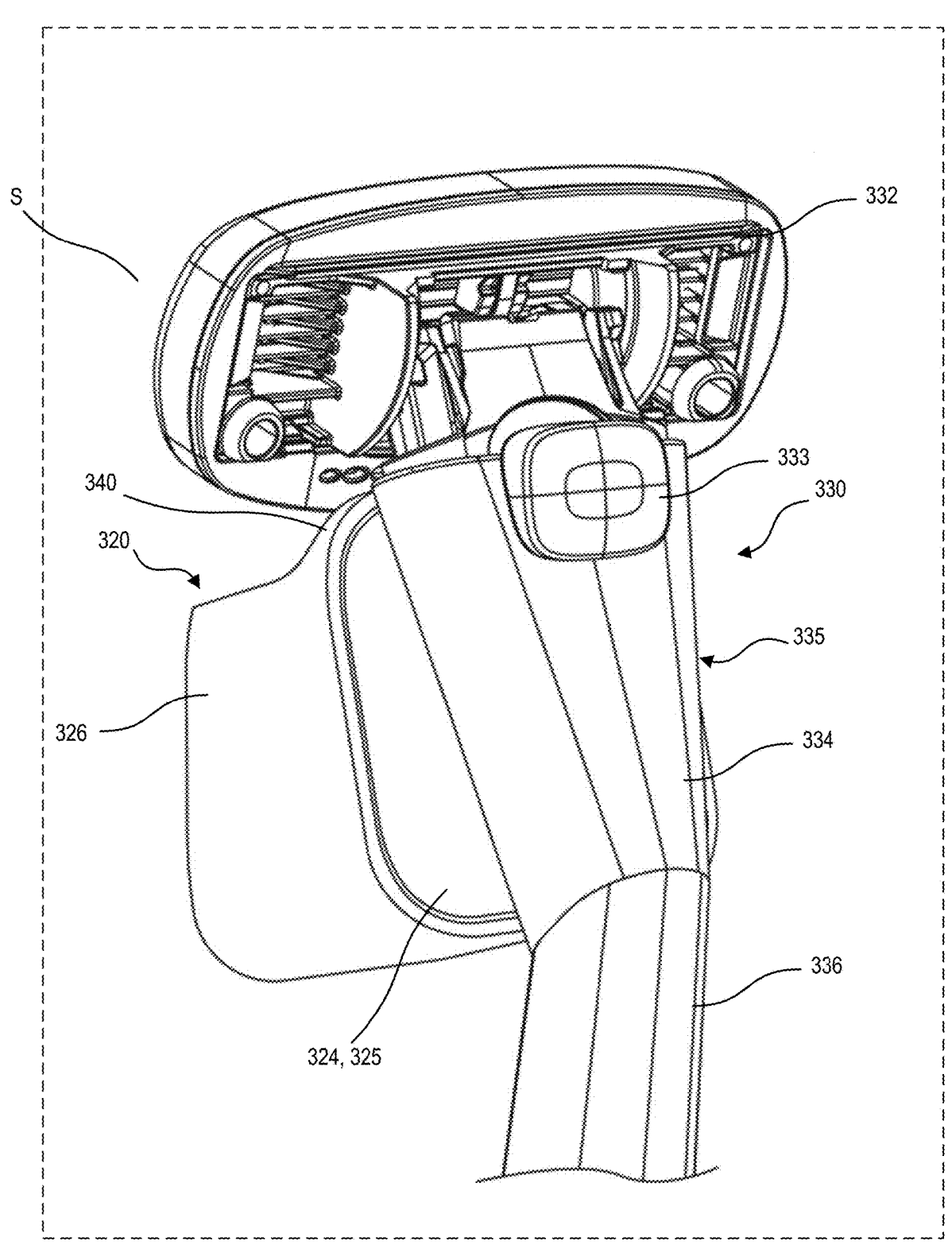
FIG. 10 is a perspective view of the razor and holder of FIG. 9.

Although the front surface 125 of the holder is shown as being circular, in other embodiments, the front surface can have any desired shape (elliptical, square, rectangular, oval, or the like). For example, FIGS. 8-10 illustrate another embodiment of a holder that can be used to removable couple an article to a mounting surface in the same or similar manner as described above for holder 120. The holder 320 includes a rear plate (not shown) (also referred to as "rear portion") having a first surface (not shown) (also referred to herein as a "rear surface"), a front plate 324 (also referred to as "front portion") having a second surface 325 (also referred to herein as front surface), and a base portion 326. In some embodiment, the front plate 324, the base 326 and the rear plate are each separate components coupled together with, for example, an adhesive or welding. In some embodiments, the rear plate can be formed integrally or monolithically with the base 326 and coupled to the front plate 324, or the front plate 324 can be formed integrally or monolithically with the base 326 and be coupled to the rear plate. In yet other embodiments, the rear plate, the front plate 324, and the base 326 can be monolithically formed.

The holder 320 can be mounted to the mounting surface S in any suitable manner described herein. In some embodiments, the holder 320 can be mounted with an adhesive member (not shown) disposed on the rear surface of the rear plate. The adhesive member can be for example, a two-sided adhesive tape that has a first side that is adhesively attached to the rear surface and a second opposite side that includes an adhesive to affix the holder 320 to the mounting surface S. The second side of the adhesive member can include an adhesive cover that is removable by a user to expose the adhesive and mount the holder 320 to a mounting surface. In other embodiments, the holder 320 can include a magnetically attractable rear surface to allow the holder 320 to be mounted to a magnetic material (e.g., a ferromagnetic material, such as steel).

Similar to the holder 120, the holder 320 includes a protrusion 340 that extends from a top surface 321 of the holder 320. The protrusion 340 can be formed by the base 326 or the base portion and/or the front plate 324. The protrusion 340 is configured to engage a portion of an article to be removably coupled to the holder 320 such as the contact portion 337 of the razor 330. The protrusion 340 can maintain the article (e.g., razor 330) on the holder 320 while providing for easy removal of the article when desired by a user. As shown in FIG. 8, in this embodiment, the front surface 325 of the holder 320 has a square shape. The front surface 325 is also a planar flat surface across a width and length of the front plate 324. The flat surface and size of the front surface 325 can accommodate a variety of different articles to be coupled to the holder 320 as described above for holder 120.

In addition to the protrusion 340, the holder 320 can optionally include a magnet (not shown) disposed within the base 326 that can be used to provide a further point of attachment for an article to the holder 320. In some embodiments, the front plate 324 can be formed at least in part with a magnetic material rather than providing a magnet within the base 326 such that the front plate 324 can provide a magnetic coupling to an article. In some cases, an article to be coupled to the holder 320 can include a portion formed of a ferromagnetic material such that the portion will be magnetically attracted to the magnet of the holder 320 (or to the front plate 324). The combination of the protrusion 340 and the magnet can provide for better fixation of the article to the holder 320 by providing two coupling points for an article with the holder 320. In addition, in some situations, the holder 320 can accommodate holding more than one article. For example, a first article can be coupled to the protrusion 340 and a second article can be magnetically coupled to the holder 320. In some cases, more than one article can be coupled to the holder 320 via the protrusion 340. For example, an article, such as a razor, can be coupled to the holder 320 (e.g., via the protrusion 340 and the magnet) and a second article, such as a loofa, can hang from the protrusion 340.

As shown in FIG. 9, as with the holder 120, the front plate 324 (and front surface 325) of the holder 320 is disposed at angle relative to the back plate such that when an article is removably coupled to the holder 320, at least a portion of the article is disposed non-parallel to the mounting surface S to help maintain the article coupled to the holder 320. The angled front surface 325 can also maintain the position of a lower portion of the article disposed away from the mounting surface S. Said another way, a bottom portion of the holder 320 is disposed at a greater distance from the mounting surface S than a top portion of the holder 320. A contact edge 341 (see FIG. 9) of the protrusion 340 is disposed at a distance from the rear surface of the holder 320 and is where an article can engage the protrusion 340 to be held on the holder 320. The contact edge 341 can provide a flat surface such that when certain articles are coupled to the holder 320, the engaging portion of the article can rest against the flat surface. The angle can be, for example, between about 5 and 30 degrees. In some embodiments the angle can correspond to an article coupling angle (or bend angle of a handle), which can also be between about 5 and 30 degrees.

As shown in FIGS. 9 and 10, the razor 330 includes a handle 335 and a razor head 332. The handle 335 includes a top portion 334 and a bottom portion 336. The razor 330 also includes a release button 333 that can be used to release the razor head 330 from the handle 335. In this embodiment, the top portion 334 is formed with a ferromagnetic material and is disposed at an angle relative to the bottom portion 336 to provide for better ergonomics when using the razor 330. The top portion 334 of the handle 335 includes a contact surface 331 that can engage the front surface 325 of the holder 320. In some embodiments, the contact surface 331 has an angle that corresponds to the angle of the front surface of the holder 320. As shown, for example, in FIG. 9, the razor 330 can be coupled to the holder 320 with the razor head 332 disposed over the protrusion 340 with a contact portion 337 of the razor head 332 engaged with the contact edge 341 of the protrusion 340 to prevent the razor 330 from falling downward. As described above, the contact edge 341 provides a flat surface such that the razor head 332 can sit upwards (does not angle downwards), which can help prevent accumulation of humidity and rust on the razor head 332 (FIG. 9 illustrates the razor head 332 not fully engaged with the contact edge for illustration purposes). In addition, the contact surface 331 of the top portion 334 of the handle 335 is engaged with the front surface 325 of the holder 320 such that top portion 334 of the handle 335 is magnetically coupled to the holder 320 via the magnet within the holder 320. The razor 330 can be removed from the holder 320 by grasping the handle 335 and lifting the razor head 332 off of the protrusion 340. The handle 335 is unobstructed in all directions to provide for easy access to grasp the handle 335. As shown in FIG. 10, when the razor 330 is coupled to the holder 320, a portion of the front surface 325 of the holder 320 is unobstructed. Said another way, the front surface 325 of the holder 320 has a surface area greater than a surface area of the contact surface 331 of the top portion 334 of the handle 335 such that a portion of the front surface 325 is uncovered when the razor 330 is coupled to the holder 320. As with the holder 120, this allows for the razor 330 to be easily placed on the holder 320. In other words, the size and shape of the front surface 325 of the holder 320 is not limited to the size and shape of the razor 330. Thus, the holder 320 can be used to hold razors with different sizes and shapes and/or various types of different articles.

Figure 11:
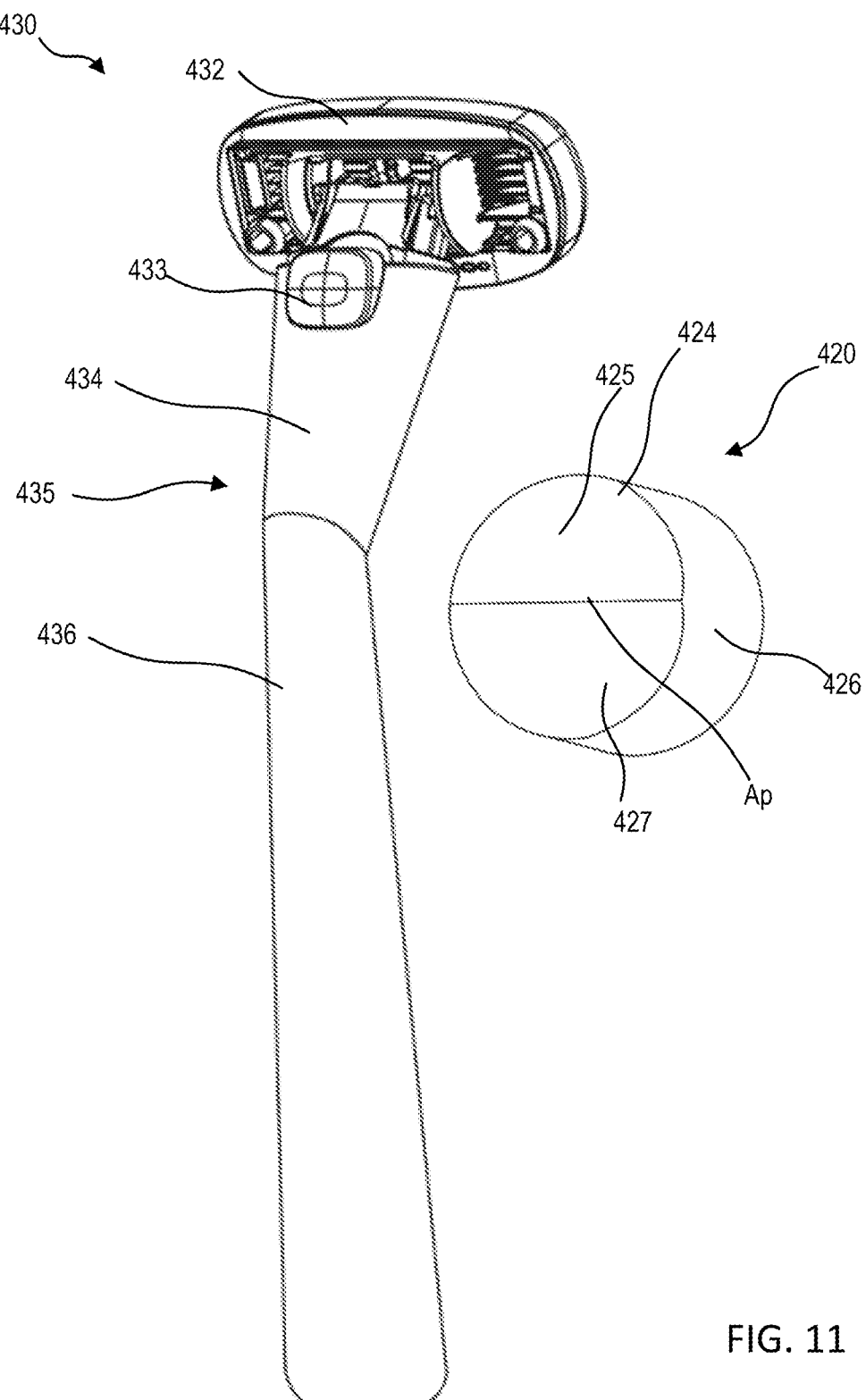
FIG. 11 is a perspective view of a razor and holder according to an embodiment, shown uncoupled to each other.
Figure 12:
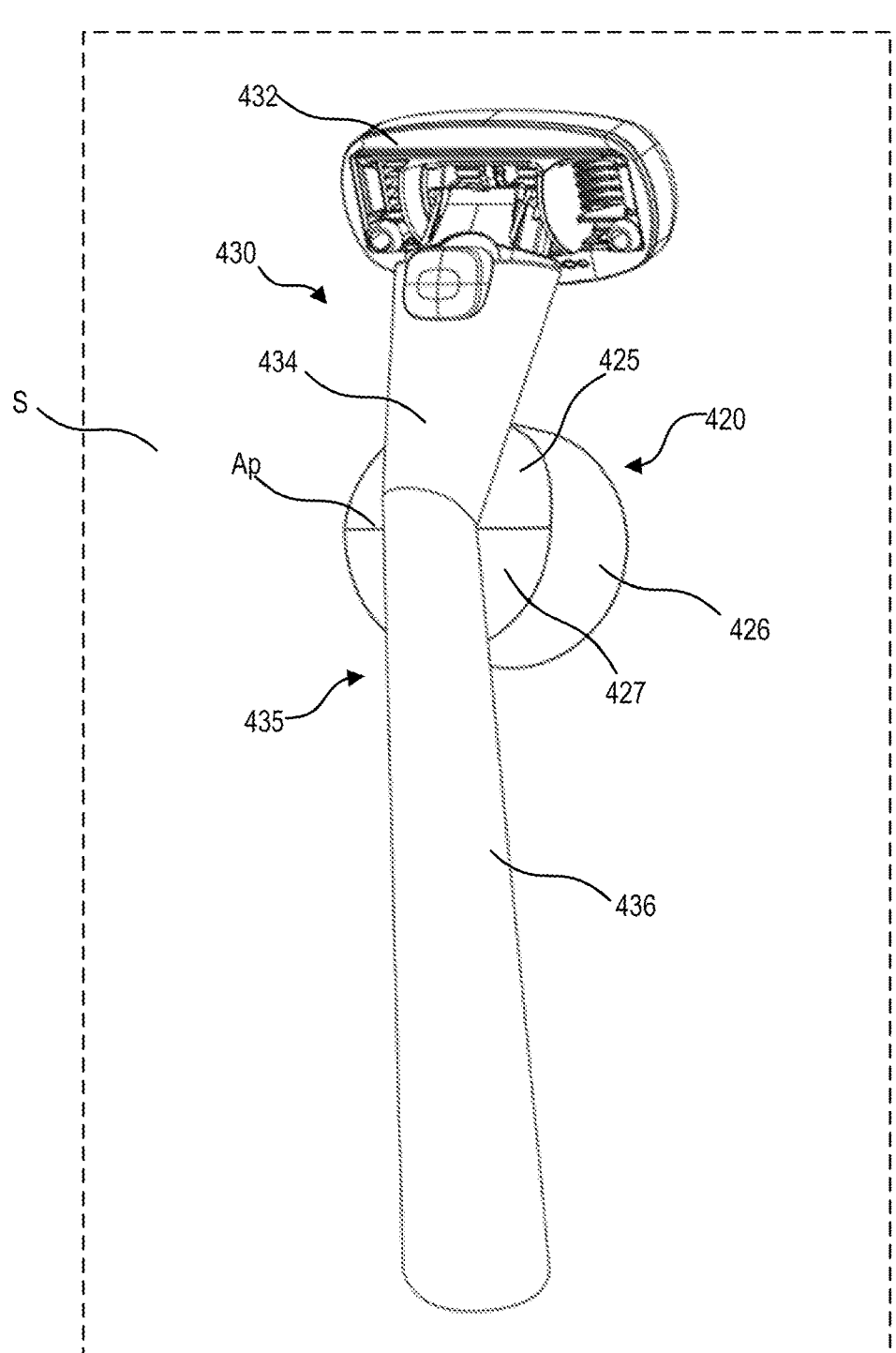
FIG. 12 is a perspective view of the razor and holder of FIG. 11 shown with the razor coupled to the holder.
Figure 13:
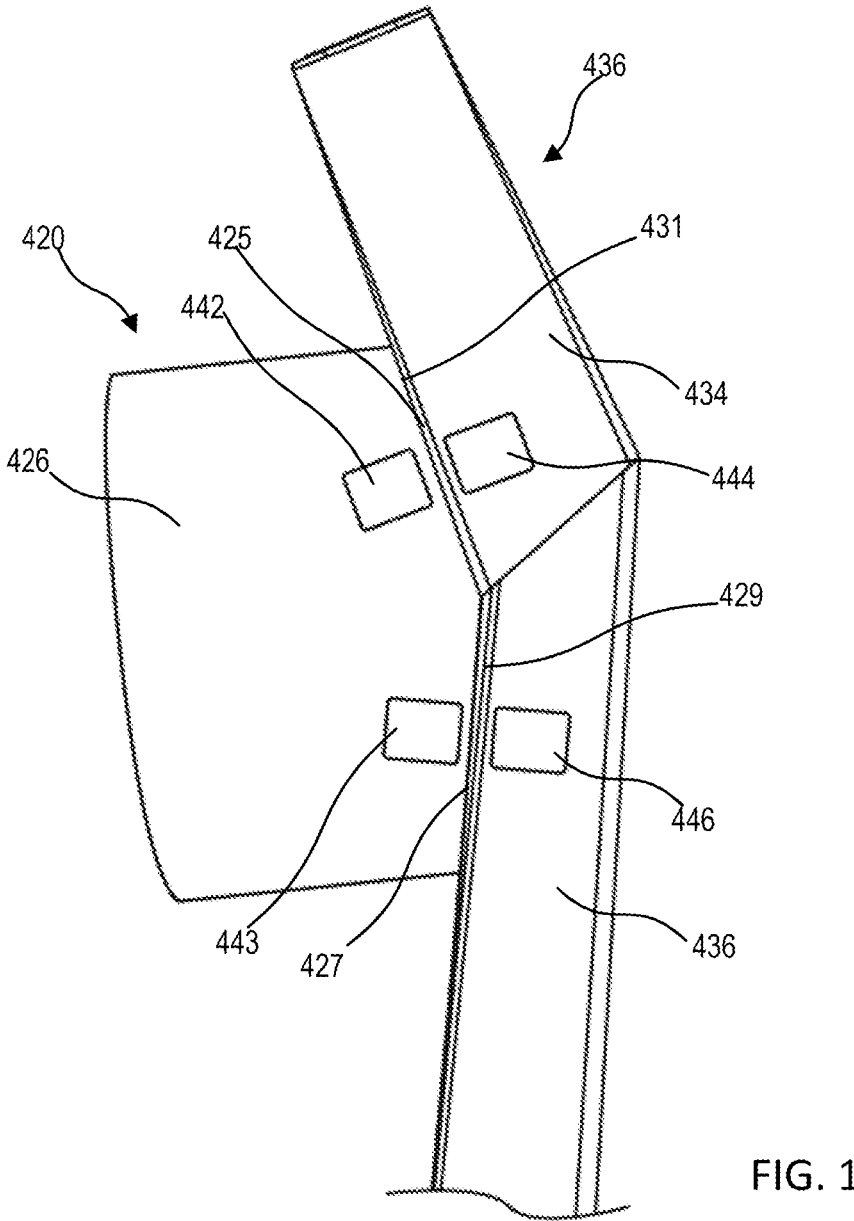
FIG. 13 is a side view illustrating a portion of a handle of the razor of FIG. 11 coupled to the holder of FIG. 12 and illustrating magnets within the handle and holder.

FIGS. 11-13 illustrate yet another embodiment of a holder that can be used to removably couple an article, such as razor 430 shown in FIGS. 11-13, to a mounting surface in the same or similar manner as described above for holder 120. The holder 420 can include a rear plate (not shown) (also referred to as "rear portion") having a first surface (not shown) (also referred to herein as a "rear surface"), a front plate 424 (also referred to as "front portion") having a second surface 425 (also referred to herein as a first front surface) and a third surface 427 (also referred to herein as a second front surface), and a base portion 426. In some embodiments, the front plate 424, the base 426 and the rear plate are each separate components coupled together with, for example, an adhesive or welding. In some embodiments, the rear plate can be formed integrally or monolithically with the base 426 and coupled to the front plate 424, or the front plate 424 can be formed integrally or monolithically with the base 426 and be coupled to the rear plate. In yet other embodiments, the rear plate, the front plate 424, and the base 426 can be monolithically formed.

The holder 420 can be mounted to a mounting surface S (see FIG. 12) in any suitable manner described herein. In some embodiments, the holder 420 can be mounted with an adhesive member (not shown) disposed on the rear surface of the rear plate. The adhesive member can be for example, a two-sided adhesive tape that has a first side that is adhesively attached to the rear surface and a second opposite side that includes an adhesive to affix the holder 420 to the mounting surface S. The second side of the adhesive member can include an adhesive cover that is removable by a user to expose the adhesive and mount the holder 420 to a mounting surface. In other embodiments, the holder 420 can include a magnetically attractable rear surface to allow the holder 420 to be mounted to a magnetic material (e.g., a ferromagnetic material, such as steel).

In this embodiment, the first front surface 425 is a planar flat surface that is angled in a first direction relative to the first surface (i.e., rear surface) of the rear plate and the second front surface 427 is a planar flat surface that is angled in a second, opposite direction relative to the first surface of the rear plate. Said another way, the first front surface 425 and the second front surface 427 come together at an apex Ap and are angled in a direction away from each other. In some embodiments, the first front surface 425 and the second front surface 427 are angled to correspond to an angled contact surface 431 of a top portion 434 (also referred to herein as "first portion) of the handle 435, and an angled contact surface 429 of a bottom portion 436 (also referred to herein as "second portion") of the handle 435 of the razor 430.

The holder 420 can also include one or more magnets to magnetically and removably couple an article (e.g., the razor 430) to the holder 420. For example, as shown in FIG. 13, the holder 420 can include a first magnet 442 and a second magnet 443 disposed within the base 426 that can be used to provide a point of attachment for an article to the holder 420. In some embodiments, the front plate 424 can be formed at least in part with a magnetic material rather than providing a magnet within the base 426 such that the front plate 424 can provide a magnetic coupling to an article. In some cases, an article to be coupled to the holder 420 can include a portion formed of a ferromagnetic material such that the portion will be magnetically attracted to one or both of the magnets 442 and 443 of the holder 420 (or to the front plate 424). In some embodiments, an article, such as razor 430, can include one or more magnets that can be magnetically coupled to the one or more magnets of the holder 420. For example, as shown in FIG. 13, a magnet 444 and a magnet 446 are disposed within the handle 435 of the razor 430. The magnet 444 and the magnet 446 can each have an opposite polarity as the first magnet 442 and second magnet 443 within the holder 420 such that the magnets 444 and 446 can be magnetically coupled to the first magnet 442 and the second magnet 443, respectively, to removably couple the razor 430 to the holder 420. In addition, in some situations, the holder 420 can accommodate holding more than one article. For example, a first article can be magnetically coupled to the holder 420 via the first magnet 442 and a second article can be magnetically coupled to the holder 420 via the second magnet 443.

As best shown in FIG. 13, and as described above, the front plate 424 (and front surfaces 425 and 427) of the holder 420 are disposed at angles relative to the back plate such that when an article is removably coupled to the holder 420, at least a portion of the article is disposed non-parallel to the mounting surface S to help maintain the article coupled to the holder 420.

As shown in FIGS. 11 and 12, the razor 430 includes the handle 435 and a razor head 432. As described above, the handle 435 includes the top portion 434 and the bottom portion 436. The razor 430 also includes a release button 433 that can be used to release the razor head 430 from the handle 435. Although FIG. 13 shows the handle 430 including two magnets 444 and 446, in alternative embodiments, the top portion 434 of the handle 435 can be formed with a ferromagnetic material to magnetically couple to the holder 420. The top portion 434 is disposed at an angle relative to the bottom portion 436 to provide for better ergonomics when using the razor 430. The top portion 434 of the handle 435 includes the contact surface 431 that can engage the first front surface 425 of the holder 420 and the bottom portion 436 includes the contact surface 429 that can engage the second front surface 427 of the holder 420. As shown, for example, in FIG. 13, the contact surface 431 of the top portion 434 of the handle 435 is engaged with the first front surface 425 of the holder 420 such that the top portion 434 of the handle 435 is magnetically coupled to the holder 420 via the magnet 442 within the holder 420 and the magnet 444 within the handle 435. And the contact surface 429 of the bottom portion 436 of the handle 435 is engaged with the second front surface 427 of the holder 420 such that the bottom portion 436 of the handle 435 is magnetically coupled to the holder 420 via the magnet 443 within the holder 420 and the magnet 446 within the handle 435. When the razor 430 is coupled to the holder 420, the handle 435 is unobstructed in all directions to provide for easy access to grasp the handle 435 (see e.g., FIG. 12). As shown in FIG. 12, when the razor 430 is coupled to the holder 420, a portion of the first front surface 425 of the holder 420 is unobstructed and a portion of the second front surface 427 of the holder is unobstructed. Said another way, the first front surface 425 of the holder 420 has a surface area greater than a surface area of the contact surface 431 of the top portion 434 of the handle 435 such that a portion of the first front surface 425 is uncovered when the razor 430 is coupled to the holder 420. Similarly, the second front surface 427 of the holder 420 has a surface area greater than a surface area of the contact surface 429 of the bottom portion 436 of the handle 435 such that a portion of the second front surface 427 is uncovered when the razor 430 is coupled to the holder 420. As with the holder 120, this allows for the razor 430 to be easily placed on the holder 420. In other words, the size and shape of the front surface 425 of the holder 420 is not limited to the size and shape of the razor 430. Thus, the holder 420 can be used to hold razors with different sizes and shapes and/or various types of different articles.

Figure 14:
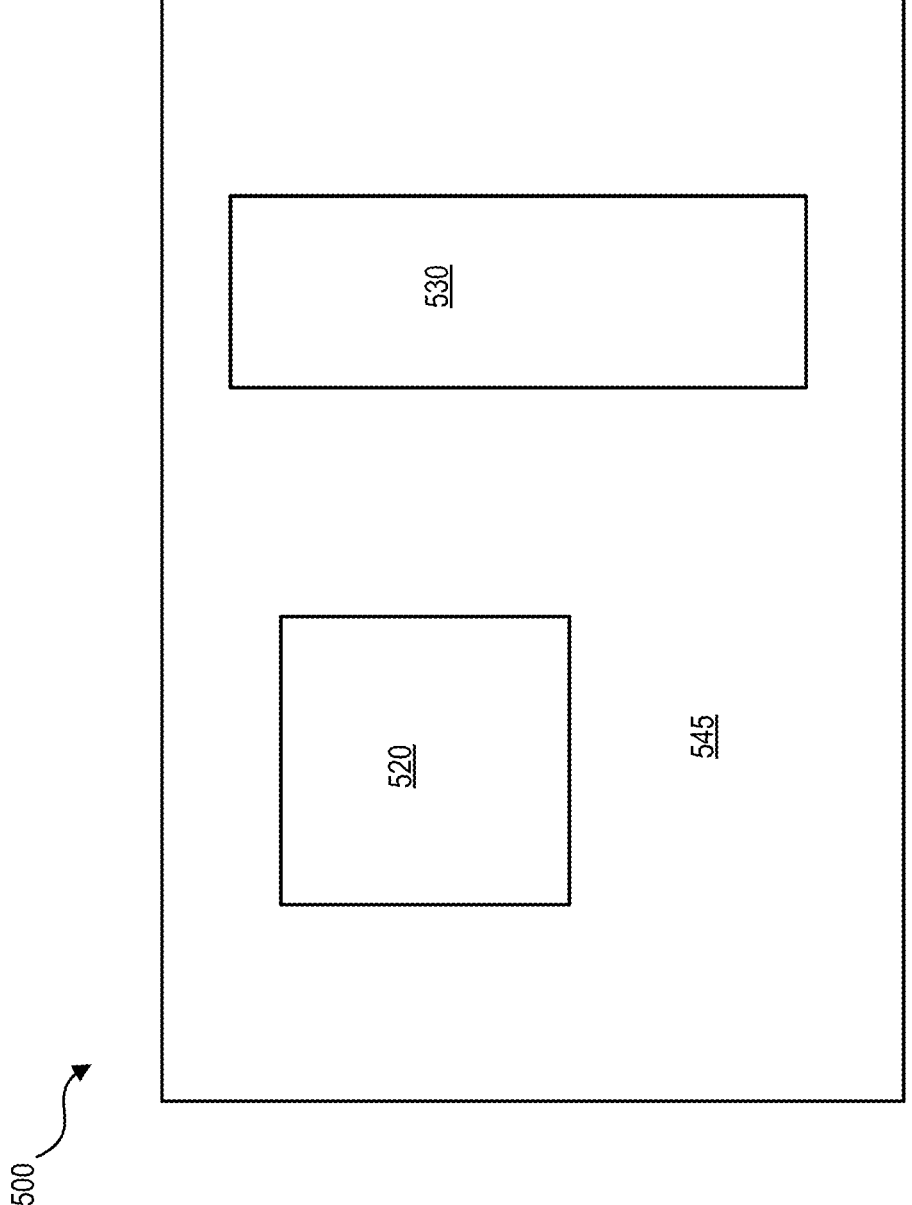
FIG. 14 is a schematic illustration of a kit, according to an embodiment.

The embodiments of a holder described herein can be provided in a kit that can include a holder and an article to be removably mounted on the holder. FIG. 14 is a schematic illustration of a kit 500 that includes a package 545 with a holder 520 and an article 530 disposed therein. The holder 520 can be any of the holders (e.g., 120, 320, 420) described herein and the article 530 can be any article that can be coupled to the holder 520. For example, in some embodiments, the article 530 is a razor such as the razor 130, 230, 330 or 430 described herein.

While various embodiments have been described above, it should be understood that they have been presented by way of example only, and not limitation. Where methods and/or schematics described above indicate certain events and/or flow patterns occurring in certain order, the ordering of certain events and/or operations may be modified. While the embodiments have been particularly shown and described, it will be understood that various changes in form and details may be made.

Although various embodiments have been described as having particular features and/or combinations of components, other embodiments are possible having various combinations or subcombinations of any features and/or components from any of the embodiments described herein. For example, any of the embodiments of a holder (e.g., 120, 320, 420, 520) can include only the protrusion (e.g., 140, 340, 440) for coupling an article to the holder. Although the various embodiments of a holder are shown only with a razor coupled thereto, as described herein, the holders can be used to removably coupled a variety of different types of articles to a mounting surface.

Further, although the articles (e.g., razors 130, 230, 330, 430) are shown being coupled to the holders (120, 320, 420) in a vertical orientation (i.e., longitudinal axis substantially vertical) by the flat, upper portion of the handle, in other embodiments, the magnetic coupling of the holder can facilitate coupling an article in any suitable orientation. For example, the handle can be coupled to the holder at a bottom portion of the handle, attached in a tilted orientation, attached to different side of the handle, attached with the razor head facing outward, etc. In some embodiments, the bottom portion of the handle can be formed at least in part with a ferromagnetic material and can be magnetically coupled to the front surface of the holder. For example, in some embodiments, the razor handle can have a ferromagnetic core that allows it to be magnetically coupled to the holder at any location along the handle.

What is claimed is:

1. A kit, comprising:

a razor having a razor head and a handle coupled to the razor head; and a holder including a body having a rear portion, a front portion and a magnet, the rear portion of the body having a first surface configured to be coupled to a vertical surface, the front portion of the body having a planar second surface, the second surface on an opposite side of the body than the first surface and being angled relative to the first surface, the magnet positioned within the body such that a portion of the second surface is magnetically attractable to the handle, the body forming a protrusion extending from a top surface of the body and angled relative to the first surface, the protrusion configured to engage the razor head and the second surface of the holder configured to engage the handle to removably couple the razor to the holder.

2. The holder of claim 1, wherein the handle is the only portion of the razor that engages the second surface of the holder.

3. The holder of claim 1, wherein:
the first surface is flat; and
the first surface and the second surface define a coupling angle of between 5 degrees and 30 degrees.

4. The holder of claim 1, wherein a first handle has an angle corresponding to the angle of the second surface of the holder when the razor is coupled to the holder.

5. The holder of claim 4, wherein:
the second surface of the holder has a surface area greater than a surface area of the first handle such that a portion of the second surface is uncovered when the razor is coupled to the holder.

6. The kit of claim 1, wherein:
the second surface extends across a width of the holder and has a vertical centerline;
the protrusion engages the razor head such that the handle of the razor is aligned with the vertical centerline of the second surface.

7. The kit of claim 1, wherein:
the protrusion has a top surface that is continuous along an entire width of the protrusion.

8. The kit of claim 1, wherein:
the handle includes a portion that extends vertically below a bottom surface of the holder when the razor is removably coupled to the holder.

9. A kit, comprising:
a razor having a razor head and a handle coupled to the razor head; and
a holder having a body, the body including a rear portion, a front portion and a protrusion;
the rear portion of the body having a first surface, the first surface configured to be coupled to a vertical surface,
the front portion of the body having a second surface, the second surface being planar and disposed on an opposite side of the body than the first surface and being angled relative to the first surface, the second surface configured to engage a planar surface of the handle of the razor, and
the protrusion extending upwardly from a top surface of the holder and angled relative to the first surface of the rear portion of the body, the protrusion configured to engage the razor head to removably couple the razor to the holder when the planar surface of the handle is engaged against the second surface of the front portion.

10. The kit of claim 9, wherein the planar surface of the handle that is engageable to the second surface of the holder is the only handle couplable to the second surface of the holder.

11. The kit of claim 9, wherein the handle has an angle corresponding to the angle of the second surface of the holder when coupled to the second surface of the holder.

12. The kit of claim 9, wherein:
the second surface of the holder has a surface area greater than a surface area of the planar surface of the handle, such that a portion of the second surface is uncovered when the razor is coupled to the holder.

13. The kit of claim 9, wherein the protrusion extends from the top surface of the body such that when the razor is removably coupled to the holder, the razor is not removable in a downward direction.

14. The kit of claim 9, wherein a distance is defined between the first surface of the holder and the protrusion such that the razor head is disposed at a spaced distance from the first surface when coupled to the holder.

15. The kit of claim 9, wherein:
the protrusion is angled relative to the first surface of the rear portion of the body in a direction towards the first surface.

16. The kit of claim 9, wherein:
the second surface is angled relative to the first surface in a first direction, the protrusion is angled relative to the first surface in a second direction, the first direction is the same as the second direction.

17. A kit, comprising:
a razor and a holder,
the razor having a razor head and a handle coupled to the razor head,
the holder including a first portion, a second portion and a body portion, the first portion including a first surface configured to be coupled to a vertical surface;
the second portion including a planar second surface, the planar second surface being angled relative to the first surface, and
the body portion being disposed in between the first portion and the second portion, the body portion having a top surface, the planar second surface configured to engage a portion of the handle of the razor; and
the second portion of the holder including a protrusion portion extending from the top surface of the body portion, the protrusion portion having a front surface coplanar with the planar second surface, the protrusion portion configured to engage the razor head of the razor to removably couple the razor to the holder when the handle of the razor is engaged against the planar second surface.

18. The holder of claim 17, further comprising:
a magnet disposed within an interior region of the body portion, the handle of the razor being magnetically couplable to the second surface via the magnet.

19. The holder of claim 16, wherein:
the second direction is in a direction towards the first surface.

*    *    *    *    *